Dec. 20, 1932.  W. D. JORDAN ET AL  1,891,713
AIR CONDITIONING SYSTEM
Filed April 16, 1932  2 Sheets-Sheet 1

Inventors
Wayne D. Jordan
Paul D. Van Vliet
Attorneys.

Dec. 20, 1932.  W. D. JORDAN ET AL  1,891,713
AIR CONDITIONING SYSTEM
Filed April 16, 1932   2 Sheets-Sheet 2
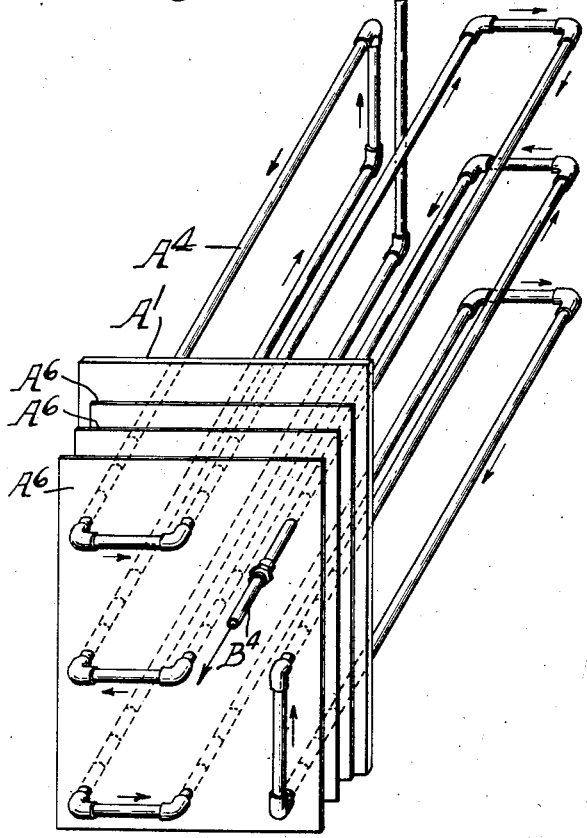
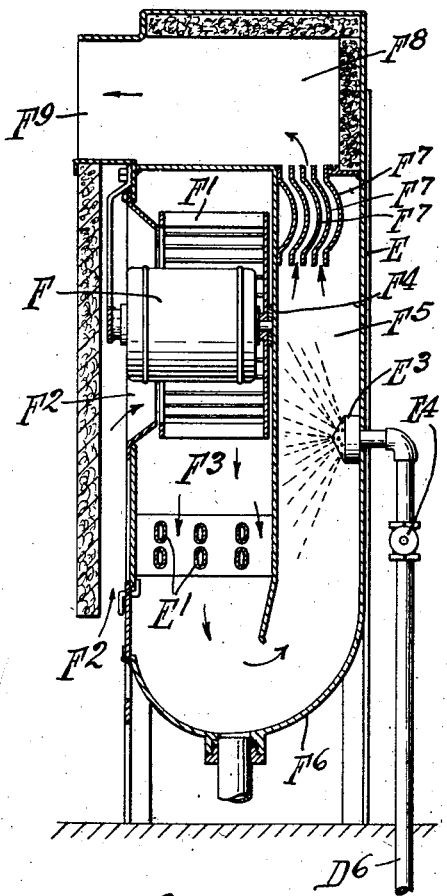
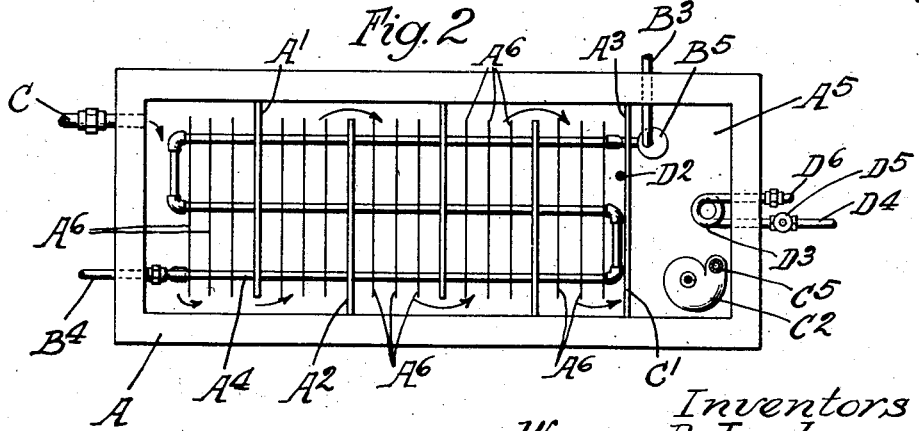
Inventors
Wayne D. Jordan
Paul D. Van Vliet
Attorneys Patented Dec. 20, 1932

1,891,713

UNITED STATES PATENT OFFICE

WAYNE D. JORDAN AND PAUL D. VAN VLIET, OF CHICAGO, ILLINOIS, ASSIGNORS TO AIR CONTROL SYSTEMS INC., OF CHICAGO, ILLINOIS, A CORPORATION OF DELAWARE

AIR CONDITIONING SYSTEM

Application filed April 16, 1932. Serial No. 605,593.

Our invention relates to improvements in air conditioning systems and has for one object to provide a new and improved apparatus and process for conditioning air, especially in warm weather, whereby the air may be cooled and dehumidified, and whereby a refrigerating means of minimum hourly capacity may be used to give a much larger hourly cooling effect expended over a period relatively short as compared with that in which the refrigerating means operates. One object of our invention, therefore, is to provide in an air conditioning system means for storing the cooling effect so that it may be drawn upon periodically. Another object is to take advantage of the latent heat of fusion of ice to assist in such storing of refrigerating effect. Another object is the provision of means for employing alternatively a heating and a cooling medium in connection with an air conditioning device. Other objects will appear from time to time throughout the specification and claims.

Our invention is illustrated more or less diagrammatically in the accompanying drawings, wherein—

Figure 2 is a plan view of the storage box;

Figure 3 is a perspective of the refrigerant or expansion coil;

Figure 4 is a section on an enlarged scale along the line 4—4 of Figure 1.

Like parts are indicated by like characters throughout the specification and drawings.

Figure 1:
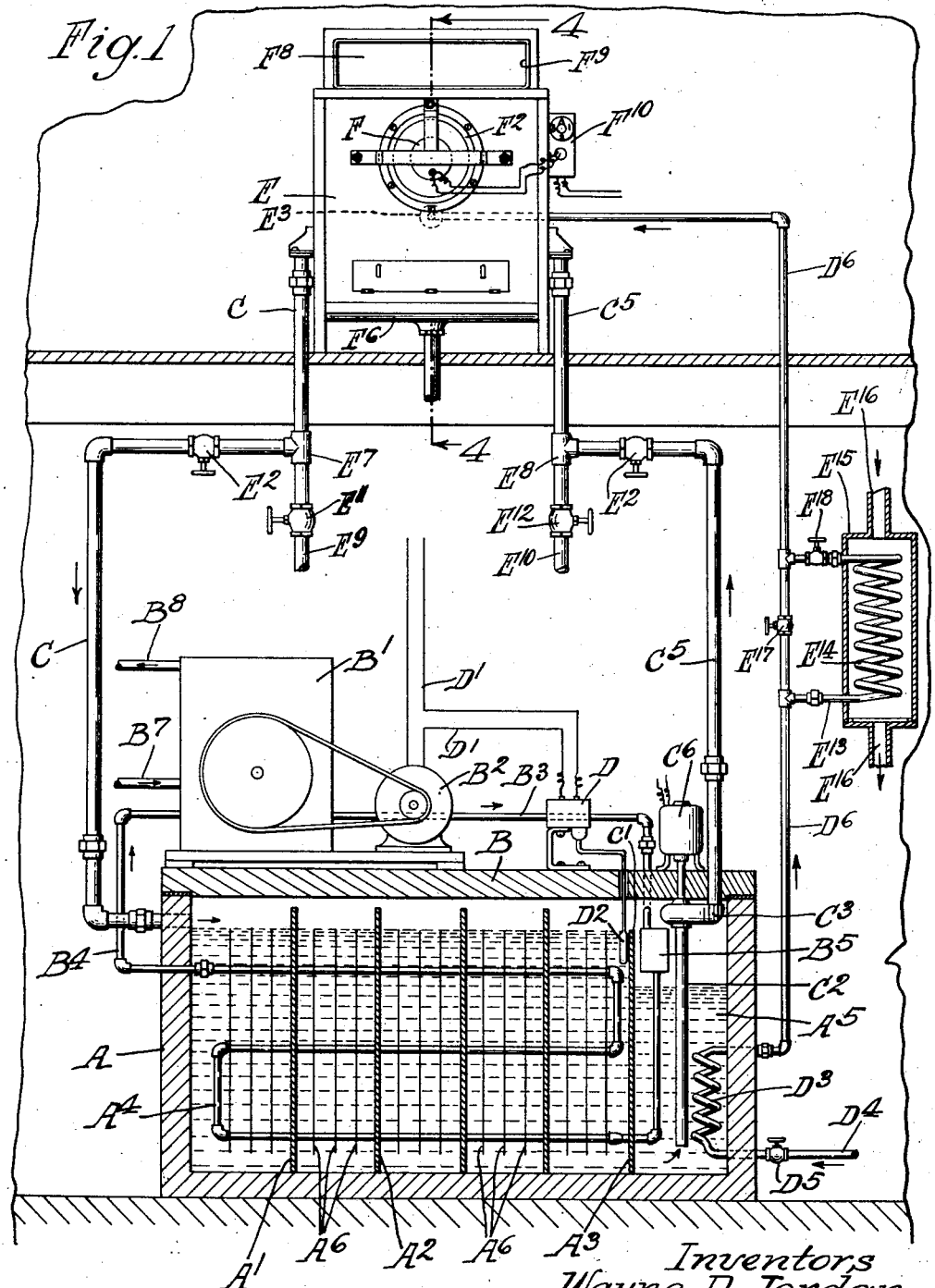
Figure 1 is a section through the storage tank with the remaining parts of the apparatus in side elevation.

A is an insulated storage tank. It contains a plurality of baffle plates $A^1 A^2$. These plates are preferably of heat conductive material, such as metal. All these plates extend clear down to the bottom as indicated and all of them terminate short of the top as indicated in Figure 1 and alternate plates are in contact with one or the other side of the tank and terminate short of the opposed side. At the end of the tank is an inner wall $A^3$ which extends clear across engaging the bottom and both sides but terminating short of the top. $A^4$ is a coil extending throughout substantially the entire area of the tank except that part beyond the wall $A^3$ where there is formed a control chamber $A^5$. The elements of the coil are in intimate contact with the baffle plates $A^1 A^2$ where they pass through them and between opposed pairs of baffle plates or between the baffle plates and the end of the tank removed from the plate $A^3$ are heat conducting fins or vanes $A^6$ which also are in intimate contact with the coil. The baffle plates $A^1 A^2$ are also in heat conducting relation with the coil.

B is a cover plate for the tank and on the cover plate is mounted a condenser unit $B^1$ comprising a gas compressor and means for cooling the compressed gas to reduce it to a liquid, driven by any suitable motor $B^2$. The condenser is in communication with both ends of the coil $A^4$ by means of pipes $B^3 B^4$, the liquified gas which serves as the refrigerant being circulated through the coil by the condenser in the direction shown by the arrow, evaporating in its passage through the coil $A^4$. $B^5$ is a float valve contained within the control chamber $A^5$ disposed between the baffle $A^3$ and the end of the tank. This float valve is for the purpose of controlling the level of the liquid refrigerant in the coil. $B^7 B^8$ are the pipes through which cooling water comes to and leaves the condenser for the purpose of cooling and liquifying the compressed gas.

C is a water pipe discharging into the tank at the top. Water comes through that pipe from any suitable heat interchange device. $C^1$ is a water port or weir through the baffle $A^3$ whereby the water level is kept as indicated so that all the coil is immersed in the tank. It is herein shown as simply a cut-off of the upper edge of the baffle $A^3$. $C^2$ is a suction pipe having its intake at the lower portion of the chamber $A^5$. $C^3$ is a water pump associated with the top of the suction pipe $C^2$ and adapted to draw water therefrom and discharge it from the pipe $C^5$ to the heat exchange device. $C^6$ is the motor to operate the pump, the pump and motor being both supported on the cover B.

D is an electric control switch to control the flow of electric current through the conductors $D^1$ from any suitable source of electric power to stop and start the compressor. This switch operates responsive to variation in temperature of the water in the tank being controlled by means of the bulb $D^2$. $D^3$ is a coil immersed in the chamber $A^5$. Water is supplied thereto through the pipe $D^4$ controlled by a valve $D^5$ and cool water passes out through the pipe $D^6$ to be associated with the heat exchange device when that takes the form, as it preferably does, of an air conditioning cabinet containing a cooling coil and a spray nozzle, the water for the spray nozzle being cooled before it is fed from the pipe $D^6$ thereto.

E is an air treating cabinet. It contains the heat interchange coil $E^1$ in series with the tank A by means of the pipes C $C^5$ making a closed circuit with them and controlled by the valves $E^2$ $E^2$. The cabinet also contains a spray nozzle $E^3$ supplied by means of the pipe $D^6$ controlled by the valve $E^4$ with water which is cooled as indicated by the coil $D^3$.

Referring for example to Figure 1, we illustrate additional connections for the pipes C and $C^5$ and may employ, for example, T's $E^7$ $E^8$, in connection with lines $E^9$ $E^{10}$, which may be in circuit with any suitable means for circulating a heating medium, such as hot water, steam, vapor or the like. $E^{11}$ $E^{12}$ are any suitable valves controlling the lines $E^9$ and $E^{10}$, which will be clear from Figure 1 that by manipulating the valves $E^2$ and the valves $E^{11}$ and $E^{12}$ the air conditioning unit or air treating cabinet E may be put in connection alternatively and at choice with the cooling system above described and with any suitable heating or heat circulating or heating medium circulating system. In other words, the coil $E^1$ may, at the choice of the operator, have passing through it either a cooling or a heating medium. Similarly the line $D^6$ is provided with any suitable bypass $E^{13}$ which may include a heat exchanging coil $E^{14}$ within a jacket $E^{15}$ which, through the line $E^{16}$, may be subjected to a flow of a heating medium. $E^{17}$ is a control valve in the line $D^6$, and $E^{18}$ is a control valve in the bypass $E^{13}$, whereby the operator may direct the liquid flowing along the line $D^6$ through the bypass, or may cut it off from the bypass.

The cabinet contains a motor F driving a fan $F^1$. In cooling and conditioning air, air is drawn into the cabinet through the suction passage $F^2$ by the fan and is discharged by the fan into the cabinet against the cooling coil $E^1$ in the direction of the arrows, as indicated. The fan and the cooling coil is contained in the air cooling chamber $F^3$ divided by means of a baffle plate $F^4$ from the spray chamber $F^5$. The bottom of the cabinet is closed by a curved wall $F^6$, whereby the cooled air, as it is forced down by the fan, is guided up and around through the spray chamber where the spray of cooled water from the spray nozzle is mixed with the air to further condition it. $F^7$ $F^7$ are a series of deflector plates at the top of the spray chamber past which the conditioned air is forced into the discharge chamber $F^8$ and thence to the room through the port $F^9$. The purpose of these deflector plates is to change the direction of the air sufficiently to cause a separation of water particles from the air stream, the inertia of the particles being such as to cause their impingement on the plates from which they drip back into the spray chamber, thereby avoiding discharging into the room air laden with unevaporated moisture. $F^{10}$ is a switch housing on the cabinet, whereby the fan may be stopped and started.

Preferably the switch housing will also contain a switch to control the water circulating pump though under some circumstances, it may be desirable to have the same switch control the fan and the pump simultaneously.

Preferably the refrigerant expansion coil is a coil, but in any event the refrigerant coil represents means in the liquid storage tank whereby heat may be withdrawn from the liquid in that tank, however that be done.

The liquid in the storage tank and circulating through the heat exchange system is preferably water because it is cheap and very easily renewed and freezes at suitable temperatures, but water is selected and described in our specification merely as indicative or exemplary of any liquid which remains such at ordinary room temperatures and which freezes or solidifies at temperatures within the range satisfactory for the purpose indicated and wherein the latent heat of fusion of the solid is such as to permit formation and storage of such solid and its subsequent melting to accomplish the purpose desired. This water might for instance have salt or alcohol added to it to lower its freezing temperature or it might have glycerine or other material added to it so that when it did freeze, it would freeze as a slush rather than a solid ice cake.

It will be understood, of course, that because the water circulating pipe and the air cooling or heat exchange coil forms a closed circuit through the storage tank, that circuit will remain filled with water and the water in the circuit plus the water remaining unfrozen in the tank is the water which will circulate when the apparatus is started up after the major part of the water in the tank has been frozen.

We have used the word "coil" in the specification because for purposes of convenience and simplicity, we have illustrated the refrigerant traveling in a coil. Manifestly, in accordance with usual refrigerating machine practice, the refrigerant might be fed into and expanded in any suitable receptacle other than a coil and we are using the term "coil", therefore, as illustrative and in its broadest meaning, namely—as a receptacle in which the refrigerant is caused to expand, be it made out of pipes or plates or anything else and whether the individual pipes or plates are actually coiled or spiraled or not.

It will be realized that many changes may be made in size, shape, number and disposition of parts without departing from the spirit of our invention, and we therefore wish our drawings and description to be taken as in a broad sense illustrative or diagrammatic rather than as limiting us specifically to the particular structure described herein and shown as an exemplification of our invention.

The use and operation of our invention are as follows:

We illustrate an air conditioning cabinet generally indicated as E, the details of which do not of themselves form part of the invention intended herein to be covered. The cabinet includes, however, a heat exchange member or members $E^1$ and means for passing through or about them the air to be conditioned by drawing it, for example by the motor F and the fan $F^1$, through the inlet passage $F^2$, the passage $F^3$, and finally through the passage $F^5$ where the air may be subjected to the action of a spray or atomization from the spray or atomizing head $E^3$. It is characteristic of our invention that the members $E^1$ may have passing through them either a cooling fluid, for example water from the tank A, or a heating fluid from the normal house heating system which may reach the members $E^1$, for example through the line $E^2$ or $E^{10}$.

Assume that the operator wishes to have the device connected with the heating system, he simply closes the valves $E^2$ and opens the valves $E^{11}$ and $E^{12}$, thus putting the members $E^1$ in communication with the normal heating systems of the house which may be heated in any suitable manner, for example by steam, vapor, hot water or the like. In summer, when the air is to be cooled rather than heated, the operator simply closes the valves $E^{11}$ and $E^{12}$ and opens the valves $E^2$ and starts the cooling system into operation.

Similarly the spray water may be either heated or cooled. In winter when the refrigerating apparatus is shut off, naturally the coil $D^3$ has no cooling effect on the water flowing through the passages $D^4$ and $D^6$, although the coil $D^3$ may be in the flow circuit. When wishing to heat the spray the operator opens the valve $E^{18}$ and closes the valve $E^{17}$ and the liquid passing along the line $D^6$ passes through the coil $E^{14}$ and is subjected to the effect of the heating medium through the jacket $E^{15}$. To sum up, we have provided means for either heating or cooling the air by means of a heat interchange member $E^1$, which air flows through the passage $F^3$, and providing futher heating or cooling of this air by means of a spray discharged from the atomizing head $E^3$.

While our broad combination of heating and cooling means is applicable to the specific air conditioning cabinet, it may be employed in connection with a variety of different heating and cooling means. Our device includes means, in effect, for storing up cold and for drawing off from stored up cold, in connection with the employment of a refrigerating unit which is considerably smaller than would be necessary in case the unit itself were required at all times to produce a refrigerating effect equal to the current load or demand of the air conditioning cabinet. Take for example an air conditioning cabinet and our refrigerating means which are used in an office where a cooling action is required for, say eight hours during the day. In such case there will be no demand from the air conditioning unit on the refrigerating means during sixteen hours and during that period the refrigerating means may operate constantly, freezing up a considerable cake of ice in the container A. Then, when normal operation of the air conditioning cabinet E begins in the morning, the compressor will continue to deliver its full refrigerating effect, but since its capacity is less than the current demand, the water returning from the air conditioner to the tank will be warmed so that the ice in the container A will be gradually melted, thus making up the deficiency. With a refrigerating means of one-third the hourly capacity of the hourly demand of the air conditioning cabinet, and operating cycles of twenty-four hours for the refrigerating means and of eight hours for the air conditioning cabinet, the full demand of the air conditioning cabinet will be met for eight hours, one-third from the operation of the refrigerating means and two-thirds from the melting of the stored ice, thus our invention permits the use of the minimum size of refrigerant compressor, which is desirable both from the standpoint of space required and also of initial cost, as against employing refrigerating means large enough to meet the full hourly demand of the air conditioning unit.

In connection with the means for storing the refrigerating effect, it will be understood that the water flowing through the line C into the container A flows over the face of the top of the ice cake at the beginning of operation, the ice cake having been built up or frozen up during the night. The level of the ice cake formation may be limited to conform generally to the upper extension of the fins $A^6$. Also the bulb $D^2$ is effective as a control, since it stops the compressor $B^1$ when the ice cake encases the bulb, and no further subsequent freezing, therefore, takes place thereafter. Referring for example to Figure 2, it will be understood that when flow of water through the line C begins in the morning when the air conditioning cabinet is put into operation, the water not merely flows across the top of the ice cake, but is constrained to a tortuous path by the baffles $A^2$ $A^1$, as will be clear from Figures 1 and 2. As the water flows, the air conditioning cabinet being in full operation, the compressor is also in operation and is able to carry part of the load. It will not carry all of the load, resulting in a slight increase in water temperature, sufficient as the warmer water flows across the ice cake, to gradually melt the top of the cake, the cake thus giving up gradually its stored refrigerating effect to maintain the refrigerating action necessary for conditioning the air. As the ice cake melts down the path open to the water increases in cross sectional area and the fins are exposed to the water, thus permitting transfer of heat from the water to the fins, and thence to the ice cake below the water level, as well as transfer to the expansion coil $A^4$, thus water is cooled both by the refrigerating effect of the ice and of the expansion coil during the operating period of the air conditioning cabinet.

An important characteristic of the operation of our device rests in the fact that when the air conditioning device begins to work, at a time when the ice may have formed on the baffles $A^1$ and $A^2$ and the vanes $A^6$ to a level adjacent the top of the weir $C^1$, the stream of water flows across the face of the metal vanes as well as across the face of the ice, there being no time at which all the surfaces of the vanes and baffles are completely covered with ice. Assume that the top dotted line in Figure 1 indicates the top of the ice level, the partitions or baffles $A^1$ $A^2$ project above the ice level and are exposed to the flow of the water. As the water melts off the top surface of the ice the heat conductive vanes $A^6$ are exposed through an increasing area and this increase of the exposed areas continues until the ice may be entirely melted away and all the vane and coil surface is exposed to the flowing water. When the water first begins its flow the cross-sectional area of the passage is at a minimum and the speed of flow of the water is at a maximum. As the ice on the vanes melts, the area of vanes exposed increases, increasing the heat transfer between the refrigerant and the water, and at the same time the velocity of the water decreases because of the increase in cross-sectional area of the passage through which it flows. It is hardly necessary to state that the transfer of heat increases almost directly in proportion to the increase in speed of flow of the liquid. Although the speed of flow of the liquid decreases as the ice melts, at the same time the exposed area of the heat conductive vanes increases, still maintaining the heat exchange at the desired level. Even when the ice is entirely melted away, the employment of the passage structure shown permits the maintenance of relatively high velocity of flow of freezable liquid through the tank, in glaring contrast to the rate of flow which would be possible in a tank of the same cubic content if the interior of the tank is not broken up into an elongated passage.

A further and vital advantage of the employment of an elongated or tortuous passage rests in the fact that it includes in the present structure the exposure of the liquid to a cold surface throughout an area vastly greater than would be possible if merely the usual spiral coil is dropped into a tank. The coil structure employed has associated with it the heat conducting baffles or vanes $A^1$ $A^2$ and the intermediate smaller conducting vanes $A^6$. These vanes, being of metal, are highly conductive of heat, and cause the actual heat exchange to take place over an area vastly greater than the area of the exterior of the coil structure itself. This exposed area of vane surfaces extends with substantial uniformity of distribution along the length of the tortuous path defined by the baffles $A^1$ $A^2$. Thus the heat exchange efficiency of the device is not merely increased by the speed of flow of the water in relation to a static body of water with mere convection currents, but also by the enormous increase of cold surface to which the water is exposed in its rapid movement through its own path.

At the end of the day's work when the operator turns off the air conditioner, preferably the motor $C^6$ is also stopped and the circulation of water is thus terminated. However, the weir $A^3$ holds the necessary water level in the freezing zone of the tank A and the compressor will continue to operate until the ice cake has been frozen to the limit permitted by the control bulb $D^2$, when it will stop.

We claim:

1. A refrigerating system comprising a storage tank, an air cooling element, means for circulating freezable liquid through them, a refrigerant condenser unit, and means to freeze part of the liquid in the tank when the heat absorption capacity of the condenser unit exceeds the amount of heat transferred to the freezable liquid including an expansion member in the storage tank, and means for constraining the freezable liquid to flow along a predetermined path through the tank and in intimate contact with both the frozen liquid and such areas of the expansion member as are not encased in frozen liquid.

2. A refrigerating system comprising a storage tank, an air cooling element, means for circulating freezable liquid through them, a refrigerant condenser unit, and means to freeze part of the liquid in the tank when the heat absorption capacity of the condenser unit exceeds the amount of heat transferred to the freezable liquid by the air cooling element including an expansion member in the storage tank, means for constraining the freezable liquid to flow along a predetermined path through the tank and about and in immediate juxtaposition to the expansion member including heat conductive plates in heat conducting relationship with the expansion member.

3. A refrigerating system comprising a storage tank, an air cooling element, means for circulating freezable liquid through them, a refrigerant condenser unit, and means to freeze part of the liquid in the tank when the heat absorption capacity of the condenser unit exceeds the amount of heat transferred to the freezable liquid by the air cooling element including an expansion member in the storage tank, means for constraining the freezable liquid to flow along a predetermined path through the tank and about and in immediate juxtaposition to the expansion member, the cross sectional area of the path available to the liquid when the tank contains frozen liquid being materially less than the path available when the liquid is not frozen.

4. A refrigerating system comprising a storage tank, an air cooling member, means for circulating freezable liquid through the tank and member, a refrigerant condenser unit and means to freeze part of the liquid in the tank when the heat absorption capacity of the condenser unit exceeds the amount of heat transferred to the freezable liquid including a cooling member in the storage tank, and means for constraining the flow of freezable liquid to close proximity to said member in the storage tank along a predetermined path.

5. A refrigerating system comprising a storage tank, an air cooling member, means for circulating freezable liquid through tank and cooling member, a refrigerant condenser unit, and a heat exchange member in the storage tank exposed to the liquid therein and adapted to freeze part of the liquid when the heat absorption capacity of the condenser unit exceeds the amount of heat transferred to the freezable liquid by the air cooling member, and means for preventing the freezing of part of the liquid in the storage tank, including a wall member extending across said tank and isolating a portion of the contents thereof from the heat exchange member.

6. An air conditioning system comprising a storage tank, an air cooling device, means for circulating a freezable liquid through said tank and air cooling device, a refrigerant condenser unit, means to freeze part of the liquid when the heat absorption capacity of the condenser unit exceeds the amount of heat transferred to the freezable liquid by the air cooling device, including a cooling member in the storage tank, associated with the condenser unit, said cooling member being exposed to the freezable liquid circulating through the tank, and means for constraining the freezable liquid to circulation along a predetermined path and in contact with both the cooling member and the surface of the frozen liquid, including vanes of heat conductive material in heat conducting relationship with the cooling member, said liquid, during its circulation through the tank, being normally continuously in contact both with said vanes and with the liquid frozen upon said vanes.

7. An air conditioning system including an air circulating device, and means for circulating air therethrough, means for cooling the air circulated therethrough, including a heat exchange means positioned in the line of flow of the air, a storage tank and means for circulating a freezable liquid through said storage tank and said heat exchange means, a refrigerating machine for freezing a portion of the freezable liquid, a cooling member in said tank including an expansion cooling member in said tank including tubes for said refrigerant for said refrigerant and metal plates associated with said tubes in heat conductive relationship with said tubes, said plates being formed to provide a predetermined passageway for the flow of unfrozen liquid across the face of the frozen portion of said liquid, said plates including portions extending beyond the normal formation of frozen liquid and exposed normally at all times to the unfrozen liquid for rapid heat transmission effective after the tubes and parts of the plates nearest the tubes are covered with the frozen liquid.

8. A refrigerating system comprising a storage tank, an air cooling element, means for circulating a freezable liquid through storage tank and air cooling elements, a refrigerant condenser unit, an expansion member, in the storage tank, means to freeze part of the liquid in the tank when the heat absorption capacity of the condenser unit exceeds the amount of heat transferred to the freezable liquid, including said expansion member, said expansion member including a tubular structure, heat conductive vanes in heat conducting relationship with said tubular structure, and means for constraining the freezable liquid to flow in a predetermined path through the tank and in intimate contact both with the frozen liquid and with such areas of the vanes as are not encased in frozen liquid.

9. A refrigerating system comprising a storage tank, an air cooling element, means for circulating a freezable liquid through storage tank and air cooling element, a refrigerant condenser unit, means to freeze part of the liquid in the tank when the heat absorption capacity of the condenser unit exceeds the amount of heat transferred to the freezable liquid, including said expansion member, said expansion member including a tubular structure, heat conductive vanes in heat conducting relationship with said tubular structure, and means for constraining the freezable liquid to flow through the tank in a predetermined path and in intimate contact both with the frozen liquid and with such areas of the vanes as are not encased in frozen liquid, and means for terminating the operation of the refrigerant condenser unit upon the formation of a predetermined amount of ice upon the vanes.

10. A refrigerating system comprising an air cooling unit including a cooling member and an air washing chamber having an atomizing device therein, means for supplying water to the atomizing device, a refrigerating condensing unit, a tank for liquid having cooling means associated therewith, means for circulating said liquid through the cooling member in said air cooling unit, and means in said tank for cooling the water supplied to the atomizing device.

11. A refrigerating system comprising a liquid storage tank, an air cooling chamber having an atomizer and a heat transfer member therein, means for circulating a liquid through the tank and through the heat transfer member, cooling means associated with the tank, and means for delivering water to said atomizer including a tubular coil immersed in said tank and through which said water passes on its way to said atomizer.

Signed at Chicago, county of Cook and State of Illinois, this 9th day of April, 1932.

WAYNE D. JORDAN.
PAUL D. VAN VLIET.